United States Patent
Lim et al.

(10) Patent No.: US 7,609,761 B2
(45) Date of Patent: Oct. 27, 2009

(54) APPARATUS AND METHOD FOR ABSTRACTING MOTION PICTURE SHAPE DESCRIPTOR INCLUDING STATISTICAL CHARACTERISTIC OF STILL PICTURE SHAPE DESCRIPTOR, AND VIDEO INDEXING SYSTEM AND METHOD USING THE SAME

(75) Inventors: Woo-Young Lim, Seoul (KR);
Young-Sik Choi, Seoul (KR);
Hae-Kwang Kim, Seoul (KR);
Sang-Youn Lee, Seongnam-si (KR)

(73) Assignee: KT Corporation, Kyoungki-do (KR)

( * ) Notice: Subject to any disclaimer, the term of this patent is extended or adjusted under 35 U.S.C. 154(b) by 937 days.

(21) Appl. No.: 10/500,168

(22) PCT Filed: Sep. 27, 2002

(86) PCT No.: PCT/KR02/01830

§ 371 (c)(1),
(2), (4) Date: Jun. 23, 2004

(87) PCT Pub. No.: WO03/056463

PCT Pub. Date: Jul. 10, 2003

(65) Prior Publication Data

US 2005/0012815 A1    Jan. 20, 2005

(30) Foreign Application Priority Data

Dec. 31, 2001   (KR) .................. 10-2001-0089027

(51) Int. Cl.
*H04N 7/12* (2006.01)
*H04N 11/02* (2006.01)

(52) U.S. Cl. .................. 375/240.08; 375/240.26

(58) Field of Classification Search ..................
375/240.01–240.08, 240.12–240.16, 240.26
See application file for complete search history.

(56) References Cited

U.S. PATENT DOCUMENTS

| | | | | |
|---|---|---|---|---|
| 4,809,350 | A * | 2/1989 | Shimoni et al. | 382/238 |
| 6,404,814 | B1 * | 6/2002 | Apostolopoulos et al. | 375/240.12 |
| 6,577,679 | B1 * | 6/2003 | Apostolopoulos | 375/240.12 |
| 6,728,314 | B2 * | 4/2004 | Kan et al. | 375/240.12 |
| 7,023,441 | B2 * | 4/2006 | Choi et al. | 345/441 |
| 7,143,434 | B1 * | 11/2006 | Paek et al. | 725/142 |

OTHER PUBLICATIONS

"Techniques and Systems for Image and Video Retrieval", IEEE Transactions on Konwledge and Data Engineering, vol. 11, No. 1, Jan./Feb. 1999, pp. 56-63.
"Object Based Video Abstraction Using Cluster Analysis", 2001 IEEE, pp. 657-660, 0-7803-6725-1.

* cited by examiner

*Primary Examiner*—David Czekaj
(74) *Attorney, Agent, or Firm*—Blakely, Sokoloff, Taylor & Zafman LLP

(57) ABSTRACT

An apparatus and method for abstracting motion picture shape descriptor including statistical characteristics of still picture shape descriptor, and video indexing system and method using the same. The video indexing system includes: Segmenting means for segmenting video; Abstracting means for abstracting motion picture shape descriptor information from the segmented video information; and Storing means for storing the motion picture shape descriptor information as metadata.

14 Claims, 4 Drawing Sheets

| MOTION PICTURE SHAPE DESCRIPTOR VECTOR | TITLE OF MOTION PICTURE | FILE NAME | STARTING TIME |
|---|---|---|---|
| [1,5,7,9,10,10] | "KICK THE MOON" | c:\moon.mpeg | 00:20:00 |
| [3,9,7,10,8,5] | "KICK THE MOON" | c:\moon.mpeg | 00:30:20 |
| [2,3,8,9,8,2] | "WHALE HUNTING" | c:\whalehunting.mpeg | 00:00:15 |
| [1,4,7,9,9,10] | | | |
| ... | ... | ... | ... |
| [1,5,2,1,3,4] | "MAZINGA Z" | c:\mazinga.mpeg | 00:50:55 |

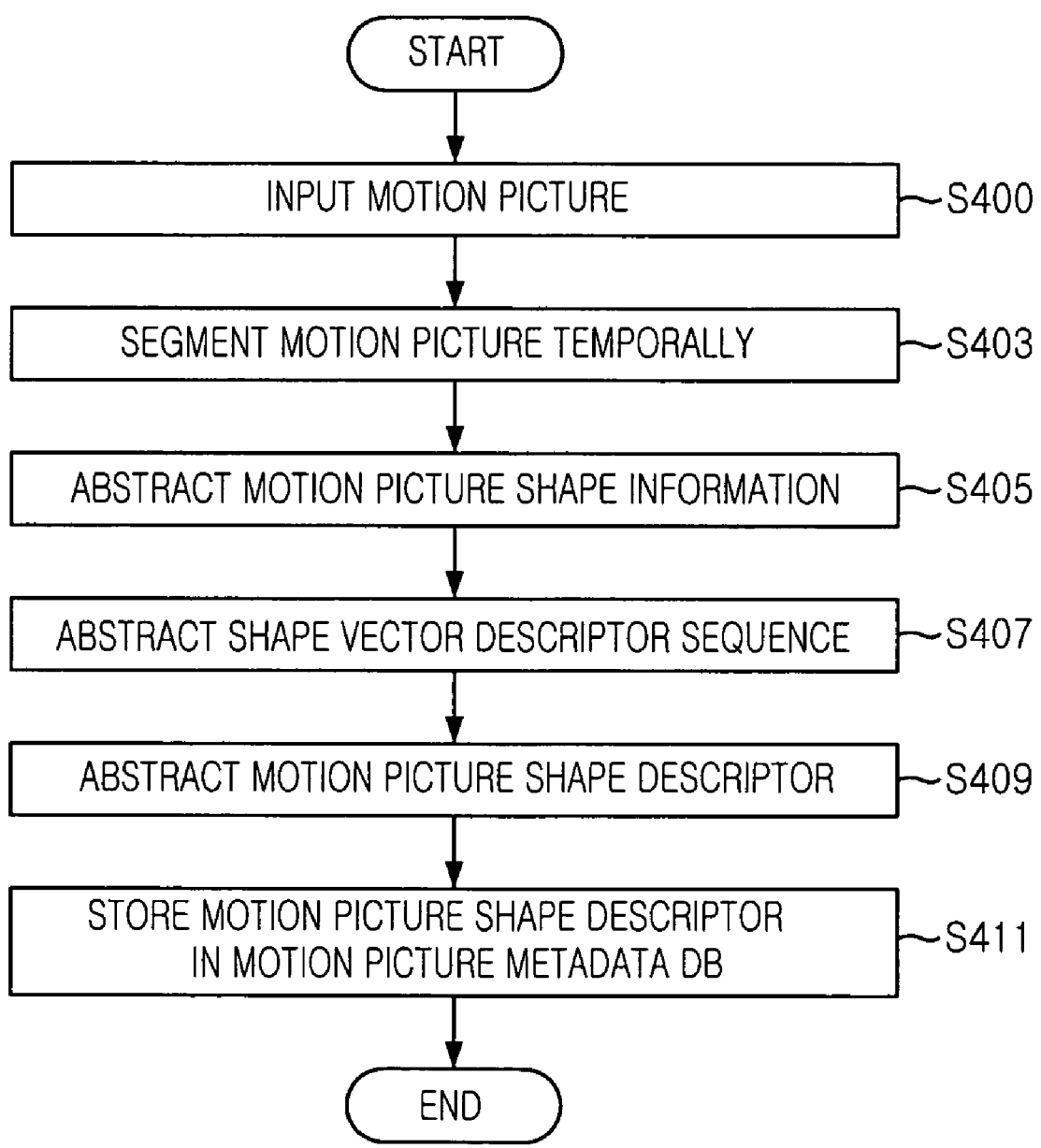

APPARATUS AND METHOD FOR ABSTRACTING MOTION PICTURE SHAPE DESCRIPTOR INCLUDING STATISTICAL CHARACTERISTIC OF STILL PICTURE SHAPE DESCRIPTOR, AND VIDEO INDEXING SYSTEM AND METHOD USING THE SAME

TECHNICAL FIELD

The present invention relates to an apparatus and method for abstracting motion picture shape descriptors having statistical characteristics of still picture shape descriptors, a video indexing apparatus using the motion picture shape descriptor abstracting apparatus and method, and a computer-readable recording medium for recording a program that implements the motion picture shape descriptor abstracting method.

BACKGROUND ART

Increasing amount of video and audio data calls for technologies for retrieving and managing the data efficiently. One of these technologies is a multimedia indexing technique for abstracting indexing information representing multimedia data to be used for data retrieval and searching.

Currently, with respect to a still picture, color histograms, shape descriptors and/or texture descriptors are used to abstract indexing information representing multimedia data, and for audio data, spectrum descriptors are used. With respect to a motion picture, motion information descriptors using motion vectors and/or orbit descriptors of objects are used. However, the descriptors of the conventional technologies are not those descriptors used to dynamically index shape information of objects within a video.

In addition, as one dynamic. indexing method for indexing the dynamic change of shape data, there is a method indexing the shape information of an object from the entire still pictures that compose a motion picture or from some representative still pictures by using the conventional still picture shape information indexing method. However, this method has a shortcoming that the data storing and retrieving efficiency is poor, because the amount of indexing information is increased, as the number of still pictures used for abstracting shape data is increased.

DISCLOSURE OF INVENTION

It is, therefore, an object of the present invention to provide an apparatus and method for abstracting motion picture shape descriptors by abstracting still picture shape descriptors from the still pictures of an object that compose a motion picture and abstracting motion picture shape descriptors having statistical characteristics from the abstracted still picture shape descriptors to use them as video indexing information, a video indexing system using the motion picture shape descriptor abstracting apparatus and method, and a computer-readable recording medium for recording a program that implements the motion picture shape descriptor abstracting method.

In accordance with one aspect of the present invention, there is provided a system for retrieving motion picture, comprising: a motion picture segmentation means for segmenting motion picture temporally; a motion picture shape descriptor abstracting means for abstracting a motion picture shape descriptor from the segmented motion picture data; and a motion picture metadata storing means for storing the motion picture shape descriptor as metadata.

BRIEF DESCRIPTION OF DRAWINGS

The above and other objects and features of the present invention will become apparent from the following description of the preferred embodiments given in conjunction with the accompanying drawings, in which:

FIG. 3 is a table showing the metadata stored in a motion picture metadata database for storing motion picture shape descriptors in accordance with the embodiment of the present invention; and FIG. 4 is a flow chart describing a method for abstracting motion picture shape descriptors in accordance with the embodiment of the present invention.

BEST MODE FOR CARRYING OUT THE INVENTION

Figure 1:
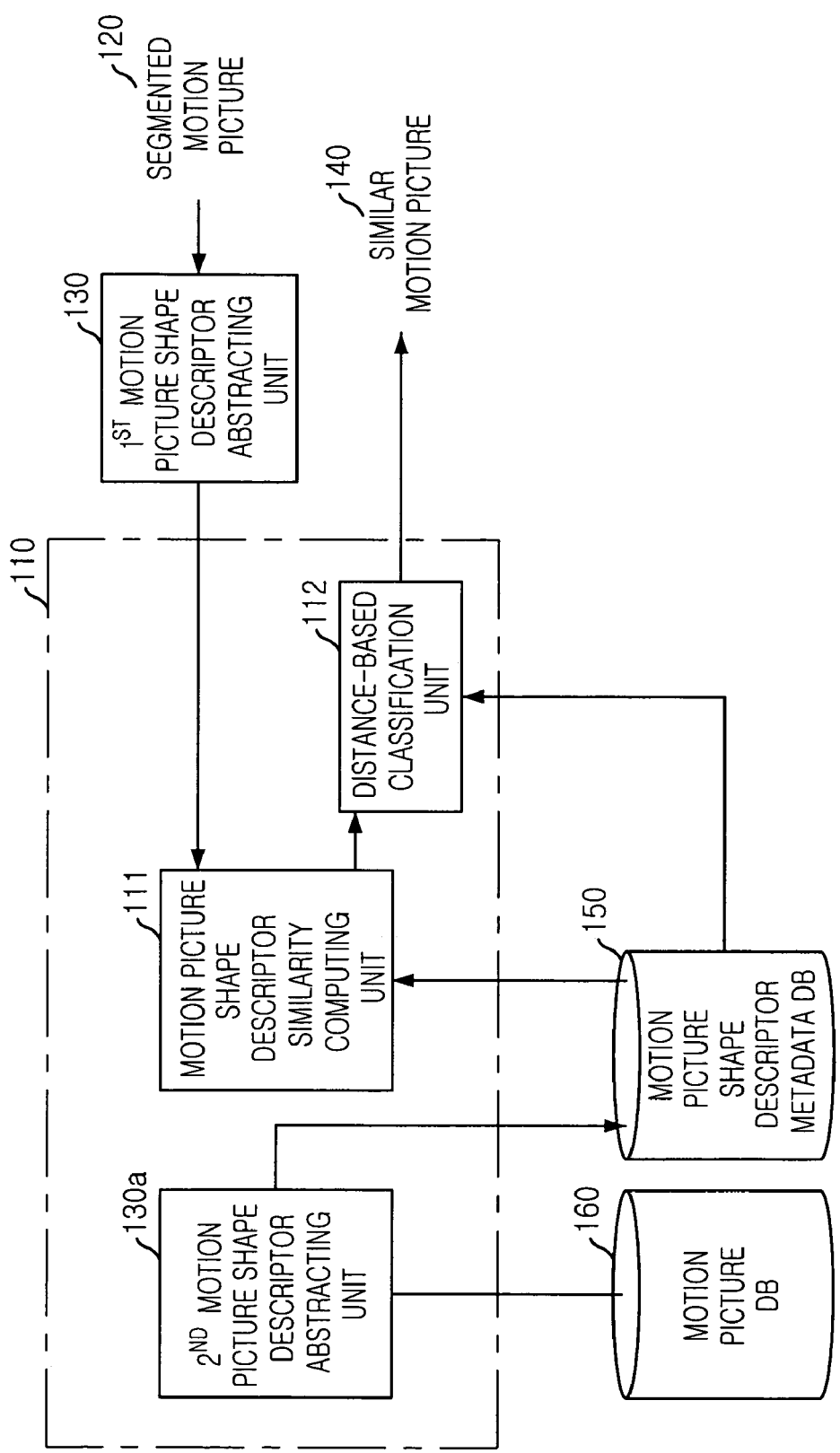
FIG. 1 is a block diagram showing a motion picture shape descriptor apparatus and a motion picture retrieving system in accordance with an embodiment of the present invention.

Generally, shape descriptors of objects for a still picture include outline-based shape descriptors and region-based shape descriptors. The present invention suggests 'a motion picture shape descriptor,' which refers to a descriptor obtained by abstracting shape descriptors, including outline-based shape descriptors or region-based shape descriptors, from the respective still pictures of objects composing a motion picture, and processing the abstracted shape descriptors statistically. The statistically processed motion picture shape descriptors, i.e., statistical characteristic descriptors, have moment characteristics, such as mean and variance.

Following is a process for abstracting motion picture shape descriptors in a statistical shape vector descriptor abstracter.

The shape sequence of an input object is expressed as $SS=\{s_1, s_2, s_3, \ldots, s_n\}$. Here, $s_m$ denotes an $m^{th}$ shape. A sequence of still picture shape descriptor $SD=\{sd_1, sd_2, sd_3, \ldots, sd_n\}$ is obtained with respect to each shape from the above shape sequence by using the conventional still picture shape descriptors, e.g., region-based ones or outline-based ones. Here, $sd_m$ is a still picture shape descriptor abstracted from an $m^{th}$ shape $s_m$. The still picture shape descriptor $sd_m$ is generally expressed as an equation in the form of a vector, i.e., Equation 1 below.

$$sd_m=\{sd_m(1), sd_m(2), sd_m(3), \ldots, sd_m(l)\} \qquad \text{Eq. 1}$$

wherein l denotes the number of elements that form the vector, and $sd_m(p)$ represents a $p^{th}$ element.

The present invention forms a motion picture shape descriptor by using the sequence SD of the still picture shape descriptor and abstracting four shape descriptors (1) to (4), enumerated below.

(1) Mean Shape Descriptor

Mean shape descriptor $sd^{av}=\{sd^{av}(1), sd^{av}(2), sd^{av}(3), \ldots, sd^{av}(l)\}$ is abstracted as follows. An $m^{th}$ element $sd^{av}(m)$ is the mean value of the $m^{th}$ element of each of n number of shape descriptors that forms $SD=\{sd1, sd2, sd3, \ldots, sdn\}$. It can be obtained based on Equation 2.

$$sd^{av}(m)=(\Sigma_{i=1 \text{ to } n} sd_i(m))/n \qquad \text{Eq. 2}$$

(2) Variance Shape Descriptor

The variance shape descriptor $sd^{var}=\{sd^{var}(1), sd^{var}(2), sd^{var}(3), \ldots, sd^{var}(l)\}$ is abstracted as follows. That is, an $m^{th}$ element $sd^{var}(m)$ is a variance value of the $m^{th}$ element of each of n number of shape descriptors that form SD={sd1, sd2, sd3, ..., sdn}. It can be obtained based on Equation 3.

$$sd^{var}(m)=(\Sigma_{i=1 \text{ to } n}(sd_i(m)-sd^{av}(m))^2)/n/(n-1) \quad \text{Eq. 3}$$

(3) Standard Deviation Shape Descriptor

The standard deviation shape descriptor $sd^{std}=\{sd^{std}(1), sd^{std}(2), sd^{std}(3), ..., sd^{std}(l)\}$ is abstracted as follows. That is, an $m^{th}$ element $sd^{std}(m)$ is a standard deviation value of the $m^{th}$ element of each of n number of shape descriptors that form SD={sd1, sd2, sd3, ..., sdn}. It can be obtained based on Equation 4.

$$sd^{std}(m)=sqrt(\Sigma_{i=1 \text{ to } n}(sd_i(m)-sd^{av}(m))2)/(n-1) \quad \text{Eq. 4}$$

(4) Differential Shape Descriptor

The differential shape descriptor shows the change of two consecutive shape descriptors in a shape descriptor sequence. The differential shape descriptor sequence DSD={$dsd_1$, $dsd_2$, $dsd_3$, ..., $dsd_{n-1}$} can be obtained from the shape descriptor SD={sd1, sd2, sd3, ..., sdn} based on Equation 5.

$$dsd_r=(sd_{r+1}*P_{r+1})(sd_r*p_r) \quad \text{Eq. 5}$$

wherein r is in the range of 0<r<n, and $p_r$ denotes a weight of an $r^{th}$ shape descriptor $sd_r$, which can be obtained from a time rate of a shape represented by a shape descriptor occupying in the entire shape sequence.

The mean shape descriptor, variance shape descriptor and standard deviation shape descriptor, i.e., (1), (2) and (3), are obtained from the differential shape descriptor sequence DSD={$dsd_1$, $dsd_2$, $dsd_3$, ..., $dsd_{n-1}$} and used for abstracting motion picture shape descriptors.

The motion picture shape descriptors, suggested in the present invention can use the above shape descriptors alone or a combination thereof. The motion picture shape descriptors abstracted by using a combination of the shape descriptors can be expressed as:

CSSD={$cssd_1$, $cssd_2$, $cssd_i$, ..., $cssd_l$}.

wherein $cssd_1$ is one of motion picture shape descriptors suggested in the present invention.

If a still picture shape descriptor which is irrespective of the change in size and rotation is applied, a motion picture shape descriptor also irrespective of the change in size and rotation is obtained.

This method of abstracting a statistically processed motion picture shape descriptor can be used with respect to other still picture descriptors, such as still picture texture descriptor, other than the shape descriptors used in the embodiment of the present invention. Therefore, the technology of the present invention has an advantage that it can be generalized.

Other objects and aspects of the invention will become apparent from the following description of the embodiments with reference to the accompanying drawings, which is set forth hereinafter.

FIG. 1 is a block diagram showing a motion picture shape descriptor apparatus and a motion picture retrieving system in accordance with l an embodiment of the present invention.

As described in FIG. 1, the motion picture retrieving system includes: a first motion picture shape descriptor abstracting unit 130, a motion picture retrieving device 110, a motion picture database (DB) 120 and a motion picture shape descriptor metadata DB 150. The motion picture retrieving device 110 includes a second motion picture shape descriptor abstracting unit 130a, a motion picture shape descriptor similarity computing unit 111 and a distance-based classification unit 112.

Hereinafter, the operation of each element will be described.

When segmented motion picture 120 is inputted by a user, the motion picture shape descriptors for the segmented motion picture 120 are abstracted. The abstracted motion picture shape descriptors are inputted to the motion picture shape descriptor similarity computing unit of the motion picture retrieving device 110.

The motion picture stored in the motion picture DB 120 for storing motion pictures is inputted to the second motion picture shape descriptor abstracting unit 130a in the motion picture retrieving device 110. Then, the information outputted from the second motion picture shape descriptor abstracting unit 130a is stored in the motion picture shape descriptor metadata DB 150 in the form of metadata. The motion picture shape descriptor similarity computing unit 111 calculates the difference (i.e., similarity) between the motion picture shape descriptors outputted from the first motion picture shape descriptor abstracting unit 130 and the motion picture shape descriptors in the motion picture shape descriptor metadata DB 150. To calculate the similarity (i.e., distance), a method using Euclidian distance which measures the distance between two vectors or a method using the sum of absolute difference is used. The distance-based classification unit 112 sorts out the calculated distance information in the order of distances from close to far, abstracts corresponding metadata information from the motion picture shape descriptor metadata DB 150, and outputs the abstracted similar motion picture information 140 to the user.

Figure 2:
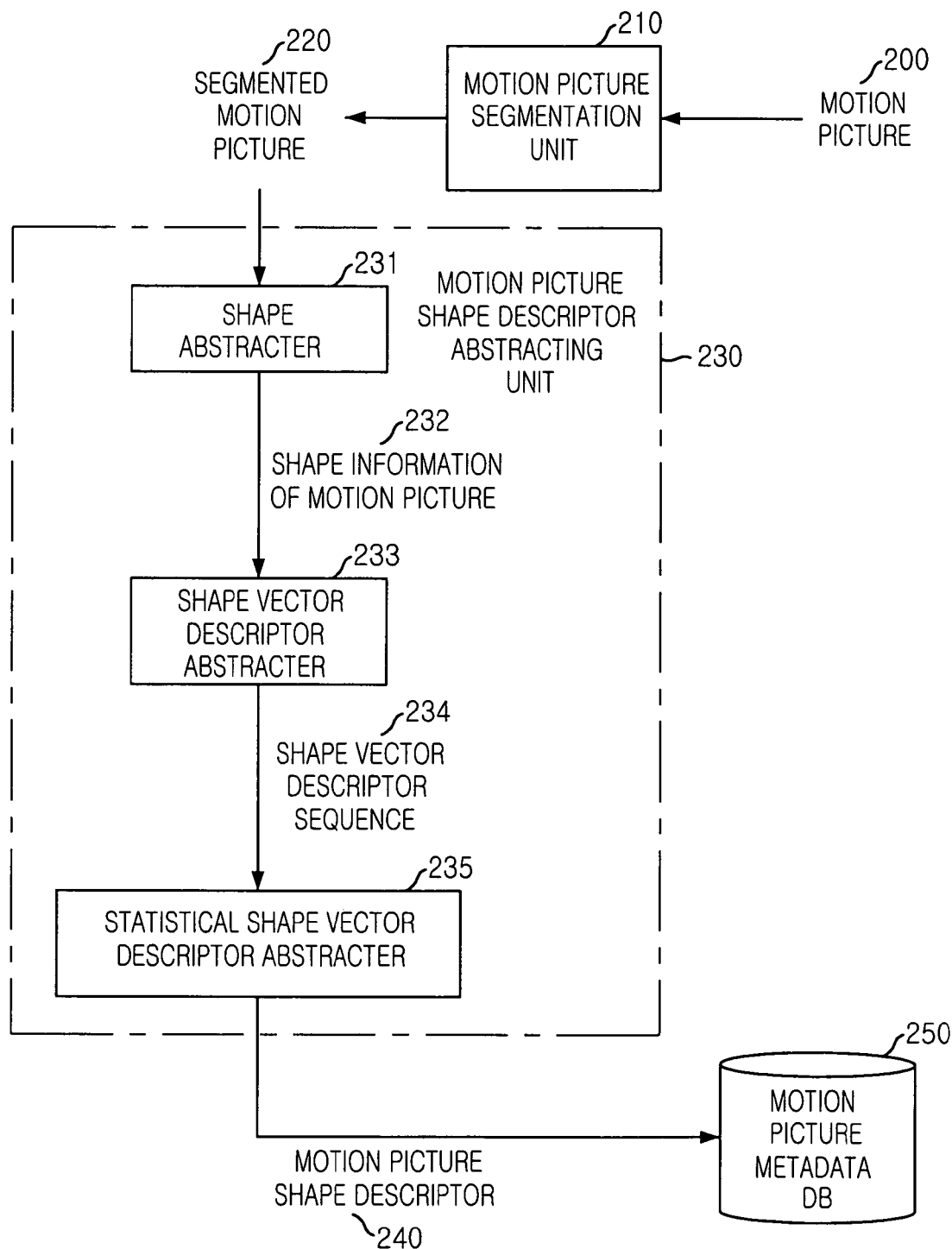
FIG. 2 is a block diagram illustrating the motion picture shape descriptor abstracter of FIG. 1 in accordance with the embodiment of the present invention.

FIG. 2 is a block diagram illustrating the motion picture shape descriptor abstracter of FIG. 1 in accordance with the embodiment of the present invention. As illustrated in the drawing, the motion picture shape descriptor abstracting unit 230 of the present invention includes: a motion picture segmentation unit 210, a motion picture shape descriptor abstracting unit 230 and a motion picture metadata DB 250. The motion picture shape descriptor abstracting unit 230 includes a shape abstracter 231, a shape vector descriptor abstracter 233 and a statistical shape vector descriptor abstracter 235.

Hereinafter, the operation of each element will be described. First, a motion picture 200 is inputted to the motion picture segmentation unit 210 and segmented temporally. The temporally segmented motion picture 200 is inputted to the shape abstracter 231, which then outputs shape information motion picture 232, corresponding to one object. The shape information of each still picture of the shape information motion picture 232 is inputted to the shape vector descriptor abstracter 233, which outputs a shape vector descriptor sequence 234.

The shape vector descriptor sequence 234 outputted from the shape vector descriptor abstracter 233 is inputted to the statistical shape vector descriptor abstracter 235. The statistical shape vector descriptor abstracter 235 outputs a motion picture shape descriptor 240 eventually, by using each or a combination of the Equations 1 through 5, each of which corresponds to the above enumerated (1) mean shape descriptor, (2) variance shape descriptor, (3) standard deviation shape descriptor and (4) differential shape descriptor. The motion picture shape descriptor 240 is stored in the motion picture metadata DB 250 for storing motion picture metadata.

FIG. 3 is a table showing the metadata stored in a motion picture metadata database for storing motion picture shape descriptors in accordance with the embodiment of the present invention. The metadata are classified based on motion picture shape vector descriptor, motion picture title, location of file, and the location of starting time in the original motion picture.

FIG. 4 is a flow chart describing a method for abstracting a motion picture shape descriptor in accordance with the embodiment of the present invention. As shown in the drawing, to abstract a motion picture shape descriptor, at step S403, an input motion picture 400 is segmented temporally, and at step S405, a shape information of motion picture corresponding to one object is abstracted from the temporally segmented motion picture.

Subsequently, at step S407, a shape vector descriptor sequence is abstracted from the abstracted shape information of motion picture. At step S409, a motion picture shape descriptor, which is a statistical shape descriptor, is abstracted from the shape vector descriptor sequence. Then, at step S411, the abstracted motion picture shape descriptor is stored in the motion picture metadata DB for storing motion picture metadata.

As described above, the technology of the present invention can store the changing shape information of a motion picture object effectively by using a motion picture shape descriptor, and using the stored motion picture information for retrieving motion picture and, further, for video indexing.

While the present invention has been described with respect to certain preferred embodiments, it will be apparent to those skilled in the art that various changes and modifications may be made without departing from the scope of the invention as defined in the following claims.

What is claimed is:

1. A system for retrieving motion picture, comprising:
a motion picture segmentation means for segmenting motion picture temporally;
a motion picture shape descriptor abstracting means for abstracting a motion picture shape descriptor from the segmented motion picture; and
a motion picture metadata storing means for storing the motion picture shape descriptor as metadata,
wherein the motion picture shape descriptor is abstracted by using one or combination of a mean shape descriptor, a variance shape descriptor, a standard deviation shape descriptor and a differential shape descriptor,
wherein the mean shape descriptor is obtained based on an Equation as:

$$sd^{av}(m)=(\Sigma_{i=1 \ to \ n}sd_i(m))/n,$$

wherein $sd_i=\{sd_i(1), sd_i(2), sd_i(3), \ldots, sd_i(m)\}$,
wherein the variance shape descriptor is obtained based on an Equation as:

$$sd^{var}(m)=(\Sigma_{i=1 \ to \ n}(sd_i(m)-sd^{av}(m))^2)/n/(n-1),$$

where $sd^{av}(m)=(\Sigma_{i=1 \ to \ n} sd_i(m))/n$, and $sd_i=\{sd_i(1), sd_i(2), sd_i(3), \ldots, sd_i(m)\}$.

2. The system as recited in claim 1, wherein the motion picture shape descriptor abstracting means includes:
a shape abstracting means for abstracting shape information corresponding to one object from the segmented motion picture;
a shape vector descriptor abstracting means for abstracting shape vector descriptor sequence from the shape information; and
a statistical shape vector descriptor abstracting means for abstracting a motion picture shape descriptor from the shape vector descriptor sequence.

3. The system as recited in claim 1, wherein the standard deviation shape descriptor is obtained based on an Equation as:

$$sd^{std}(m)=sqrt(\Sigma_{i=1 \ to \ n}(sd_i(m)-sd^{av}(m))2)/n/(n-1),$$

wherein $sd^{av}(m)=(\Sigma_{i=1 \ to \ n} sd_i(m))/n$, and $sd_i(m)=\{sd_i(1), sd_i(2), sd_i(3), \ldots, sd_i(m)\}$.

4. The system as recited in claim 1, wherein the differential shape descriptor is obtained based on an Equation as:/

$$dsd_r=(sd_{r+1}*p_{r+1})(sd_r*p_r)$$

wherein $sd_r$ denotes a shape descriptor abstracted from the $m^{th}$ shape information $s_r$;
r is in the range of 0<r<n; and
$p_r$ denotes a weight of the $r^{th}$ shape descriptor $sd_r$.

5. A system for retrieving motion picture, comprising:
a first motion picture shape descriptor abstracting means for abstracting a first motion picture shape descriptors for motion picture;
a motion picture storing means for storing the motion picture;
a motion picture shape descriptor metadata storing means for storing the first motion picture shape descriptor; and
a motion picture retrieving means for calculating the similarity between the first motion picture shape descriptor abstracted from the motion picture shape descriptor abstracting means and a second motion picture shape descriptor outputted from the motion picture shape descriptor metadata storing means, arranging the motion picture shape descriptor in the order of similarity from small to large, and outputting similar motion pictures,
wherein the first motion picture shape descriptor and the second motion picture shape descriptor are abstracted by using one or combination of a mean shape descriptor, a variance shape descriptor, a standard deviation shape descriptor and a differential shape descriptor,
wherein the mean shape descriptor is obtained based on an Equation as:

$$sd^{av}(m)=(\Sigma_{i=1 \ to \ n}sd_i(m))/n,$$

wherein $sd_i=\{sd_i(1), sd_i(2), sd_i(3), \ldots, sd_i(m)\}$,
wherein the variance shape descriptor is obtained based on an Equation as:

$$sd^{var}(m)=(\Sigma_{i=1 \ to \ n}(sd_i(m)-sd^{av}(m))^2)/n/(n-1)$$

wherein $sd^{av}(m)=(\Sigma_{i=1 \ to \ n} sd_i(m))/n$, and $sd_i=\{sd_i(1), sd_i(2), sd_i(3), \ldots, sd_i(m)\}$.

6. The system as recited in claim 5, wherein the motion picture retrieving means includes:
a second motion picture shape descriptor abstracting means for abstracting motion picture shape descriptor from the motion picture outputted from the motion picture storing means and storing the abstracted motion picture shape descriptor in the motion picture shape descriptor metadata storing means;
a motion picture shape descriptor similarity computing means for calculating the similarity between a first motion picture shape descriptor outputted from the first motion picture shape descriptor abstracting means and the second motion picture shape descriptor outputted from the motion picture shape descriptor metadata storing means; and
a distance-based classification means for classifying the similarity outputted from the motion picture shape descriptor similarity computing means and outputting the similar motion pictures.

7. The system as recited in claim 6, wherein the distance-based classification means classifies the similarity in the order of distance from close to far.

8. The system as recited in claim 6, wherein the motion picture shape descriptor similarity computing means computes the similarity based on an Euclidian distance between two input information vectors, or a sum of absolute differences.

9. The system as recited in claim 5, wherein the standard deviation shape descriptor is obtained based on an Equation as:

$$sd^{std}(m)=sqrt(\Sigma_{i=1\ to\ n}(sd_i(m)-sd^{av}(m))2)/n/(n-1),$$

wherein $sd^{av}(m)=(\Sigma_{i=1\ to\ n}\ sd_i(m))/n$, and $sd_i(m) =\{sd_i(1), sd_i(2), sd_i(3), \ldots, sd_i(m)\}$.

10. The system as recited in claim 5, wherein the differential shape descriptor is obtained based on an Equation as:/

$$dsd_r=(sd_{r+1}*p_{r+1})(sd_r*p_r),$$

wherein $sd_r$ denotes a shape descriptor abstracted from the $m^{th}$ shape information $s_r$;
r is in the range of 0<r<n; and
$p_r$ denotes a weight of the $r^{th}$ shape descriptor sd.

11. A method for abstracting a motion picture shape descriptor having statistical characteristics of still picture shape descriptors to be applied to a motion picture shape descriptor abstracting apparatus, the method comprising the steps of:
a) segmenting a motion picture temporally and abstracting shape information corresponding to one object from the temporally segmented motion picture;
b) abstracting a motion picture shape descriptor, which is a statistical shape vector descriptor, from the shape information;
c) storing the motion picture shape descriptor in a motion picture metadata storing means,
d) abstracting a shape vector descriptor sequence from the abstracted shape information of motion picture in order to abstract the motion picture shape descriptor; and
e) abstracting a motion picture shape descriptor, which is a statistical shape vector descriptor, from the shape vector descriptor sequence,
wherein the motion picture shape descriptor, which is a statistical shape vector descriptor of the step e), can be obtained based on an Equation as:

$$sd^{av}(m)=(\Sigma_{i=1\ to\ n}sd_i(m))/n,$$

wherein $sd_i=\{sd_i(1), sd_i(2), sd_i(3), \ldots, sd_i(m)\}$,
wherein the motion picture shape descriptor can be obtained based on an Equation as;

$$sd^{var}(m)=(\Sigma_{i=1\ to\ n}(sd_i(m)-sd^{av}(m))^2)/n/(n-1),$$

wherein $sd^{av}(m)=(\Sigma_{i=1\ to\ n}\ sd_i(m))/n$, and $sd_i=\{sd_i(1), sd_i(2), sd_i(3), \ldots, sd_i(m)\}$.

12. The method as recited in claim 11, wherein the motion picture shape descriptor can be obtained based on an Equation as:

$$sd^{std}(m)=sqrt(\Sigma_{i=1\ to\ n}(sd_i(m)-sd^{av}(m))2)/(n-1),$$

wherein $sd^{av}(m)=(\Sigma_{i=1\ to\ n}\ sd_i(m))/n$, and $sd_i(m)=\{sd_i(1), sd_i(2), sd_i(3), \ldots, sd_i(m)\}$.

13. The method as recited in claim 11, wherein the motion picture shape descriptor can be obtained based on an Equation as:

$$dsd_r=(sd_{r+1}*p_{r+1})(sd_r*p_r)$$

wherein sdr denotes a shape descriptor abstracted from the $m^{th}$ shape information $s_r$;
r is in the range of 0<r<n; and
$p_r$ denotes a weight of the $r^{th}$ shape descriptor $sd_r$.

14. A computer-based recording medium encoded with (stored thereon, embedded with, or embodying), causing a computer to execute a method for abstracting motion picture shape descriptors, the method comprising the steps of:
a) segmenting a motion picture temporally and abstracting shape information corresponding to one object from the temporally segmented motion picture;
b) abstracting a motion picture shape descriptor, which is a statistical shape vector descriptor, from the shape information; and
c) storing the motion picture shape descriptor in a motion picture metadata storing means,
wherein the program is implemented in a motion picture shape descriptor abstracting apparatus provided with a processor,
wherein the motion picture shape descriptor is abstracted by using one or combination of a mean shape descriptor, a variance shape descriptor, a standard deviation shape descriptor and a differential shape descriptor,
wherein the mean shape descriptor is obtained based on an Equation as:

$$sd^{av}(m)=(\Sigma_{i=1\ to\ n}sd_i(m))/n,$$

wherein $sd_i=\{sd_i(1), sd_i(2), sd_i(3), \ldots, sd_i(m)\}$,
wherein the motion picture shape descriptor is obtained based on an Equation as:

$$sd^{var}(m)=(\Sigma_{i=1\ to\ n}(sd_i(m)-sd^{av}(m))^2)/n(n-1),$$

wherein $sd^{av}(m)=(\Sigma_{i=1\ to\ n}\ sd_i(m))/n$, and $sd_i=\{sd_i(1), sd_i(2), sd_i(3), \ldots, sd_i(m)\}$.

* * * * *